(12) United States Patent
Wakabayashi et al.

(10) Patent No.: US 9,566,918 B2
(45) Date of Patent: Feb. 14, 2017

(54) WIRE HARNESS WITH SHIELD

(71) Applicant: SUMITOMO WIRING SYSTEMS, LTD., Mie (JP)

(72) Inventors: Masataka Wakabayashi, Mie (JP); Minoru Fukuda, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/819,593

(22) Filed: Aug. 6, 2015

(65) Prior Publication Data
US 2016/0064120 A1 Mar. 3, 2016

(30) Foreign Application Priority Data
Aug. 27, 2014 (JP) ................. 2014-172735

(51) Int. Cl.
| | | |
|---|---|---|
| *H01B 7/00* | (2006.01) | |
| *B60R 16/02* | (2006.01) | |
| *H01B 11/10* | (2006.01) | |
| *H02G 15/18* | (2006.01) | |
| *H01R 4/18* | (2006.01) | |
| *H01R 4/64* | (2006.01) | |

(52) U.S. Cl.
CPC ......... *B60R 16/0215* (2013.01); *H01B 7/0045* (2013.01); *H01B 11/1058* (2013.01); *H01R 4/185* (2013.01); *H01R 4/646* (2013.01); *H02G 15/1806* (2013.01)

(58) Field of Classification Search
CPC .............. B60R 16/0215; H01B 7/0045; H02G 15/1806; H01R 4/185; H01R 4/646
USPC .................. 174/72 A, 71 R, 72 R, 78, 79
See application file for complete search history.

(56) References Cited

U.S. PATENT DOCUMENTS

2016/0043507 A1* 2/2016 Rossman ............. H02G 3/0406
439/607.41

FOREIGN PATENT DOCUMENTS

| JP | 10-125138 | 5/1998 |
|---|---|---|
| JP | 2002-203437 | 7/2002 |
| JP | 2009-093934 | 4/2009 |

OTHER PUBLICATIONS

Tanaka et al. (Machine Translation of JP10-125138, May 15, 1998).*

* cited by examiner

*Primary Examiner* — Tremesha S Willis
(74) *Attorney, Agent, or Firm* — Greenblum & Bernstein, P.L.C.

(57) ABSTRACT

A wire harness having a shield structure that can exhibit a required shield effect and sufficiently meet demands for cost mitigation and weight reduction is provided. The wire harness is provided with an electrical line group that is held in a bundled manner, in which at least a portion of electrical lines that are positioned on the outer circumferential side of the electrical line group each have a metal thin-film for shielding as the outermost layer, the metal thin-film being formed so as to attach to an outer circumferential surface portion of a sheathing that surrounds a conductor of the electrical line, and a drain wire or another ground connection member that is grounded and comes into contact with the metal thin-films of the electrical lines.

4 Claims, 8 Drawing Sheets

WIRE HARNESS WITH SHIELD

TECHNICAL FIELD

The present invention relates to a wire harness, and in particular a wire harness that has a structure that shields an electrical line group of the same.

BACKGROUND ART

Conventionally, in the case of shielding (electrostatic shielding and/or electromagnetic shielding) an electrical line group of a wire harness in a predetermined routing section, a shield structure has often implemented in which the electrical line group in the section to be shielded is enveloped with a shield material such as a braided shield material, a served shield material, or an aluminum foil shield material, and then enclosed with an exterior member sheathing that envelopes the same from the outside (e.g. see JP H10-125138A and JP 2009-93934A).

Also, as a shield structure integrated with electrical lines, there is known to be a shield-including cable structure provided with a shield layer on the outer circumferential surface of an insulating layer that surrounds a conductor, and an external sheathing layer that encloses the shield layer, for example. The shield layer is configured by a metal plating layer with a thickness of 0.5 µm to 6 µm, and the outer sheathing layer has an outer diameter of 0.5 mm or less (e.g., see JP 2002-203437A).

JP H10-125138A, JP 2009-93934A, and JP 2002-203437A are examples of related art.

SUMMARY OF THE INVENTION

However, with the former conventional wire harness in which the electrical line group is enveloped by a shield material and an exterior member for sheathing, the shield material such as braided shield material or served shield material and the exterior member for sheathing are wrapped in layers around the electrical line bundle in the routing section to be shield, and therefore the task of wrapping was time consuming. Moreover, the wire harness bulges, and the demands for cost mitigation and weight reduction for the wire harness could not be sufficiently met. Also, this issue becomes prominent in the case of a routing path section to be shielded over a wide range.

Also, in the case where the latter conventional wire harness, in which a metal plating layer is formed between inner and outer sheathing lawyers, is employed in a wire harness, even if many electrical lines having this shield structure are included, it was difficult for those electrical lines to contribute to the shielding of other electrical lines. For this reason, it remains that the task of enveloping an electrical line group with a shield material in order to shield other electrical lines in a wire harness is not only consuming, but also leads to bulging of the wire harness, and demands for cost mitigation and weight reduction for the wire harness could not be sufficiently met.

The present invention has been achieved in order to resolve the above-described conventional issues, and an object thereof is to provide a wire harness having a shield structure that can exhibit the required shield effects, and sufficiently meet demands for cost mitigation and weight reduction.

In order to achieve the above object, a wire harness according to the present invention includes: an electrical line group that is held in a bundled manner, in which at least a portion of electrical lines that are positioned on an outer circumferential side of the electrical line group each have a metal thin-film for shielding as an outermost layer, the metal thin-film being formed so as to attach to an outer circumferential surface portion of a sheathing that surrounds a conductor of the electrical line, and a ground connection member that is grounded and comes into contact with the metal thin-films of the at least a portion of the electrical lines.

According to this configuration, in the present invention, at least a portion of electrical lines located on the outer circumferential side of the electrical line group are grounded via the ground connection member that comes into contact with the metal thin-films of this portion of the electrical lines. Accordingly, there are no cases in which the shield material is wrapped around the outside of the electrical line group, and shield grounding with a short ground line length and low impedance is possible. Accordingly, there is no bulging even if the shield section is long, and the wire harness can exhibit the required shield effects while keeping the number of parts and work hours low.

In the wire harness according to the present invention, the metal thin-films of the at least a portion of electrical lines may be a vapor deposition film formed by RF ion plating.

According to this configuration, the throwing power and adhesion of the metal thin-film for shielding with respect to the outer circumferential surface portion of the sheathing increases, and a fine, hard-to-peel thin metal-film for sheathing can be reliably formed in the necessary shield section.

In the wire harness according to the present invention, the ground connection may constitute a holding member that holds the plurality of electrical lines in a bundled manner.

According to this configuration, by holding the electrical line group with the holding member, the assembly of the ground connection member to the electrical line group is complete, and also the metal thin-film of the at least a portion of electrical lines can be reliably and easily brought into contact with the ground connection member.

Also, in the wire harness according to the present invention, the holding member may include a holding member body that holds the plurality of electrical lines in a bundled manner and a connection conductor film that is formed so as to attach to the holding member body, and the connection conductor film may be constituted by a vapor deposition film that is formed by RF ion plating.

In this case, adhesion of the connection conductor film, which functions as the ground connection member, to the holding member body is increased, and detaching is less likely to occur. Also, the connection conductor film that is not prone to detachment can be formed on the surface of the holding member body, which is light weight, comparatively flexible, and formed by resin or the like, and therefore a more stable state of contact can be ensured between the connection conductor film and the shielding metal thin-film of at least a portion of the electrical lines, weight reduction is possible, and also the connection conductor film and the metal thin-film for shielding are less likely to become damaged.

According to the present invention, a wire harness that has a shield structure that can exhibit the required shield effects, and sufficiently meet demands for both cost mitigation and weight reduction can be provided.

EMBODIMENTS OF THE INVENTION

Figure 1:
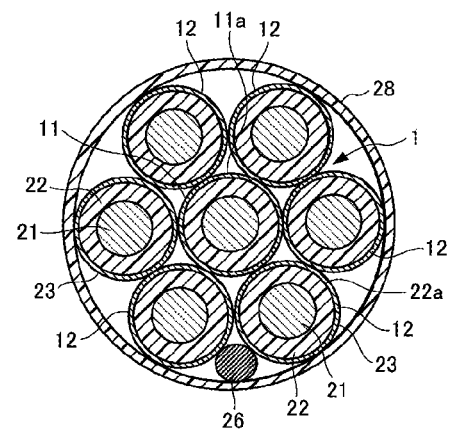
FIG. 1 is a transverse sectional view of the principal portions of an electrical line group of a wire harness that has an electrical line shield structure according to a first embodiment of the present invention.

The following describes embodiments of the present invention with reference to the drawings.

First Embodiment

FIGS. 1 to 4 show an electrical line group 1 of a wire harness W that has an electrical line shield structure according to a first embodiment of the present invention.

Note that the wire harness W of the present embodiment is a unit in which multiple connection terminals and connectors that are not shown in the drawings, and the like, are mounted onto the electrical line group 1 that is in a bundled form, and is configured such that various types of electronic devices that are equipped in a vehicle can be connected to a power source or control equipment, for example.

The electrical line group 1 of the wire harness W has flexible properties that allow it to be routed along a predetermined routing path on a vehicle body panel that is not shown in the drawings, and a shield section that requires a shield for electrostatic shielding or the like, is provided in a midway portion of the routing path. The shield for electrostatic shielding described here includes an electrostatic shield, and other shields, such as an electromagnetic shield, can also be included.

Figure 2:
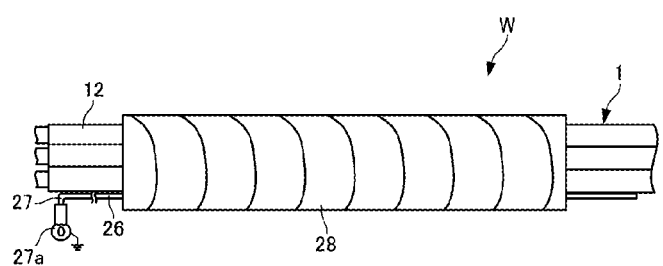
FIG. 2 is a side view of the principal portions of the electrical line group of the wire harness that has an electrical line shield structure according to the first embodiment of the present invention.

As shown in FIGS. 1 and 2, the electrical line group 1 (multiple electrical lines) is constituted including an electrical line 11 at the central side, and multiple electrical lines 12 (at least a portion of electrical lines) on the outer circumferential side that are arranged with equal gaps in a parallel configuration around the electrical line 11, for example.

Figure 3A:
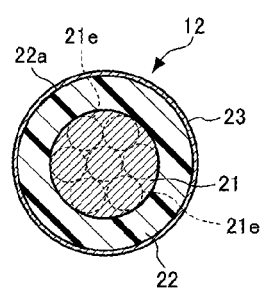
FIG. 3A is a transverse sectional view of a single electrical line of the electrical line group shown in FIG. 1 that has a metal thin-film for shielding in an outer circumferential surface portion of a sheathing.
Figure 3B:
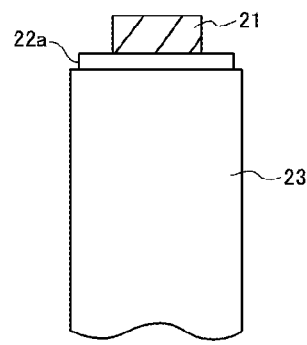
FIG. 3B is a side view of a terminal portion of the same electrical line.

As shown in FIG. 3A and FIG. 3B, each of the electrical lines 12 has a conductor 21 at its center, a cylindrical sheathing 22 that surrounds the conductor 21, and a metal thin-film 23 for shielding that has been formed so as to attach to an outer circumferential surface portion 22a of the sheathing 22.

The conductor 21 is constituted by a circular stranded line in which multiple individual wires 21e that are annealed copper wires are twisted together, for example. Of course, the conductor 21 may be constituted by a single-line core line instead of a stranded line.

The sheathing 22 is constituted by a resin tubular insulating material in which the main constituent is a material such as polyethylene or vinyl chloride, and the outer circumferential surface portion 22a is an approximately tubular surface.

The metal thin-film 23 for shielding is a thin-film constituted by aluminum (Al) or an aluminum alloy that is favorable for shields for electrostatic shielding or the like, or copper (Cu) or a copper alloy or a compound. Note that depending on the configuration and required characteristics of the electrical line group 1, it is conceivable to have a configuration in which the metal thin-film 23 for shielding has a shield layer of another metal, such as an iron or iron-based layer, which is favorable for electromagnetic shielding.

The electrical line 11 on the central side (the other electrical line) is configured similarly to the electrical lines 12 on the outer circumferential surface side. Note that an outer circumferential surface portion 11a of the electrical line 11 on the central side may be formed by an insulating sheathing layer. In other words, out of the electrical lines 11 and 12, a portion of electrical lines 12 on the outer circumferential side and the other electrical line 11 may be configured similarly to each other, but the insulating sheathing may be implemented on the outer circumferential surface portion 11a (the outermost layer) of the electrical line 11 on the central side if it is surrounded by the multiple electrical lines 12 located on the outer circumferential side of the electrical line 11. Furthermore, as described in JP 2002-203437A, the electrical line 11 may have a cylindrical metal layer for shielding between the inner and outer sheathing layers.

Also, in the electrical line group 1, other electrical lines that have an insulating sheathing layer as their outermost layer may be arranged between the electrical line 11 on the central side and the electrical lines 12 on the outer circumferential side that surround the electrical line 11, and other electrical lines that have an insulating sheathing layer as their outermost layer may be arranged outward of the electrical lines 12 on the outer circumferential side that come into contact with each other while surrounding the electrical line 11 on the central side.

In the electrical line group 1 (a plurality of electrical lines) of the wire harness W, at least a portion of the electrical lines 12 located on the outer circumferential side have the metal thin-film 23 for shielding as the outermost layer that is formed so as to attach to the outer circumferential surface portion 22a of the sheathing 22 that surrounds each of the conductors 21.

Also, in the present embodiment, the electrical lines 12 on the outer circumferential side are configured so as to surround the electrical line 11 on the central side, and therefore the electrical lines 12 on the outer circumferential side refer to electrical lines that are located on the outer circumferential side relative to the electrical line 11 that is on the central side in the electrical line group 1. Note that in a case in which there are few electrical lines in the electrical line group 1, and the other electrical line 11 that is surrounded by a portion of the electrical lines 12 does not exist, the electrical lines on the outer circumferential side will refer to electrical lines that are away from the center of the electrical line group 1 whose conductor 21 centers are in a bundled form, or all electrical lines that constitute an outer circumferential portion of the electrical line group 1.

On the other hand, a drain wire 26 that is a ground connection member comes into contact with the metal thin-film 23 of any of the electrical lines 12, and the electrical lines 11 and 12 and the drain wire 26 are surrounded from the outer circumferential side and held and banded in a single bundled state by an exterior member 28 (holding member) for holding and sheathing that has a predetermined length.

The drain wire 26 is an electrical line made up of only a conductor, for example, and is set with an outer diameter and a transverse sectional shape that can come into contact with the metal thin-films 23 of adjacent electrical lines 12 at a predetermined contact pressure between the adjacent electrical lines 12 and the exterior member 28. The drain wire 26 is grounded via a lead line 27 for grounding, to which circular terminals 27a for grounding have been mounted (illustration of the mid-portion shape and the connection portion to the drain wire 26 has been omitted), for example.

The exterior member 28 is constituted by insulating tape that is single-sided adhesive and half wrapped into an approximately cylindrical form, for example. This exterior member 28 may be in another cylindrical form, such as a heat shrink tube, or a flexible insulating sheet may be wrapped around, and glued or taped into a tubular form.

The metal thin-films 23 for shielding that are formed on the electrical lines 12 on the outer circumferential side of the electrical line group 1 are vapor deposited films that are formed by RF ion plating, which is one type of physical vapor deposition.

The RF ion plating described here is executed by using multiple vacuum chambers, which are connected in the feed direction of linear work piece, which includes a sheathing material 22 for example, and placing a vapor deposition metal material (hereinafter referred to as "vapor deposition metal material") and the work piece in a later-stage chamber equipped with an electron gun and a high-frequency induction coil.

Specifically, first, the interior of an early-stage vacuum chamber is evacuated to a high vacuum of approximately $10^{-3}$ Pa to $10^{-4}$ Pa, and the interior of the connected later-stage chamber is vacuumed to a very high vacuum of $10^{-8}$ Pa or more using a vacuum pump for very high (or extreme high) vacuum. Also an inactive gas or a reactive gas is injected into the later-stage chamber at the same time as the vacuuming.

Then, by applying a high-frequency current to the induction coil in the later-stage chamber that is in an ultra-high vacuum state, low-temperature plasma, which is obtained by separation into ions and electrons by the high-frequency electromagnetic field, is inductively generated, and the metal vapor deposition material is irradiated with an electron beam so as to vaporize the metal while negatively biasing the material of the sheathing electrical line that is an insulating material.

At this time, the metal particles become plus ions and accelerated toward the work piece side, and in the case where a reactive gas is injected into the chamber, the bonding chemical reaction between the metal particles and the reactive gas is promoted. Furthermore, the ionized vapor metal atoms and the like in the plasma are accelerated by the cathode dark space appearing in the vicinity of the workpiece, and collide with the surface of the workpiece with high energy. Accordingly, the surface portion of the workpiece is heated at the molecular level, and a metal vapor deposition film with firm adhesion is formed.

The metal thin-film 23 for shielding formed so as to attach to the outer circumferential surface portion 22a of the sheathing 22 in this way is a fine, cylindrical film that does not easily peel from the outer circumferential surface portion 22a of the sheathing 22. The film thickness of the metal thin-film 23 is set to a favorable film thickness value in accordance with the required characteristics and size (outer diameter) for the electrical line 12, and the shield performance, etc. that are required in the shield section of the electrical line group 1, for example between the smallest film thickness value of 1 μm or less and the largest film thickness value of approximately several tens of μm.

Figure 4A:
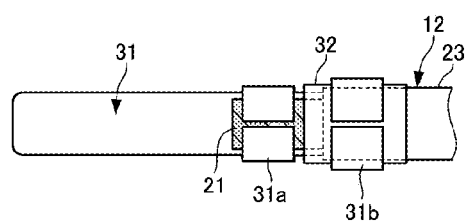
FIGS. 4A to 4C are figures that show a crimped connection terminal in a state of being mounted to a terminal portion of one of the electrical lines of the electrical line group shown in FIG. 1, FIG. 4A being a top view of a terminal mounting portion, FIG. 4B being a side view of the terminal mounting portion, and FIG. 4C being an end view of the terminal mounting portion viewed from a tip side.
Figure 4B:
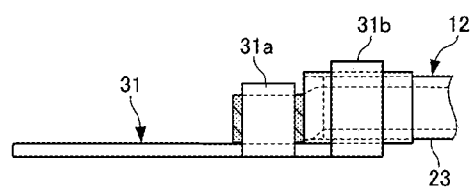
Figure 4C:
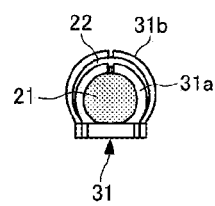

Note that the terminal portions of the electrical lines 11 and 12 are not illustrated, but as shown in FIGS. 4A to 4C, in the case of mounting a crimpled connection terminal 31 for example, a heat-shrinking insulating tube 32 that has insulating properties is mounted in the vicinity of one end of the metal thin-film 23 of the electrical lines 12. Then, after the base end side portion of the conductor 21 that is exposed on the one portion of the electrical lines 12 and the one end portion of the metal thin-film 23 have been sheathed in a close-contact shrunk state by the heat-shrinking insulating tube 32, a wire barrel portion 31a of the connection terminal 31 is crimped to the conductor 21, and an insulation barrel portion 31b of the connection terminal 31 is crimped onto one end portion of the metal thin-film 23 that has been sheathed by the heat-shrinking insulating tube 32.

Next is a description of actions.

In the wire harness W of the present embodiment configured as described above, in the electrical line group 1 held in a bundled manner, the electrical lines on the outer circumferential side of the electrical line group 1 have a metal thin-film 23 for shielding as the outermost layer formed so as to attach to the outer circumferential surface portion 22a of the sheathing 22 of the electrical lines 12, and a drain wire 26 that is grounded and comes into contact with the metal thin-film 23 of the electrical lines 12 on the outer circumferential surface.

Accordingly, at least the electrical lines 12 on the outer circumferential surface are grounded via the drain wire 26 that comes into contact with the metal thin-film 23 that is the outermost layer of the electrical lines 12, or via the drain line 26 and the metal thin-film 23 of the outermost layer of at least another one of the electrical lines 12 that mutually come into contact with and are conductive with each other.

As a result, there is no need to wrap the shield material in the form of a sheet and an exterior member for sheathing around the outside of the electrical line 1 as with the conventional methods, a light-weight and compact shield structure is obtained, and shield grounding of the electrical lines 12 on the outer circumferential side that surround the electrical line 11 on the central side is possible with a ground line that has a short length and low impedance.

Accordingly, there is no bulging even if the shield section of the electrical line group 1 is long, the number of parts and work hours is kept low, and the low-cost wire harness W can exhibit the required shield effects for the conductors 21 etc. of the electrical lines 11 and 12 of the electrical line group 1.

Also, according to the present embodiment, the metal thin-films 23 of at least a portion of the electrical lines 12 are vapor deposited films formed by RF ion plating. Accordingly, the throwing strength and the adhesiveness of the metal thin-film 23 for shielding for the outer circumferential surface portion 22a of the sheathing 22 increases, and a fine, hard-to-peel, metal thin-film 23 for shielding can be reliably formed in the necessary shield section. Note that the throwing power referred to here is the ease with which the vapor deposition film spreads to a non-vapor deposition portion, and specifically corresponds to the magnitude of the ion incidence angle range for film formation with respect to the vapor deposition target surface.

In this way, in the present embodiment, it is possible to provide a wire harness W having a shield structure that can exhibit the required shield effects, and sufficiently meet demands for cost mitigation and weight reduction.

Second Embodiment

Figure 5:
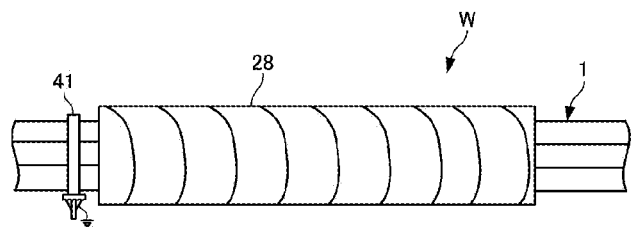
FIG. 5 is a side view of the principal portions of an electrical line group of a wire harness that has an electrical line shield structure according to a second embodiment of the present invention.
Figure 6:
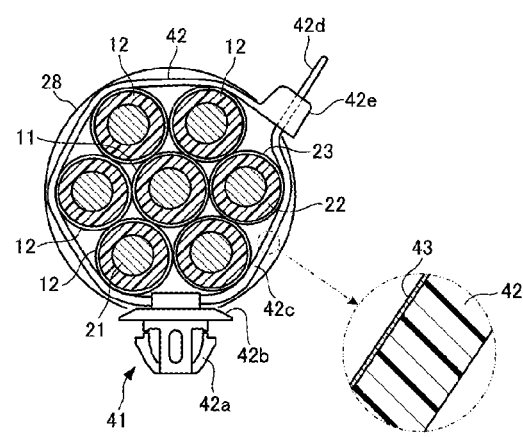
FIG. 6 is a transverse sectional view of the principal portions of the electrical line group of the wire harness that has the electrical line shield structure according to the second embodiment of the present invention.
Figure 7:
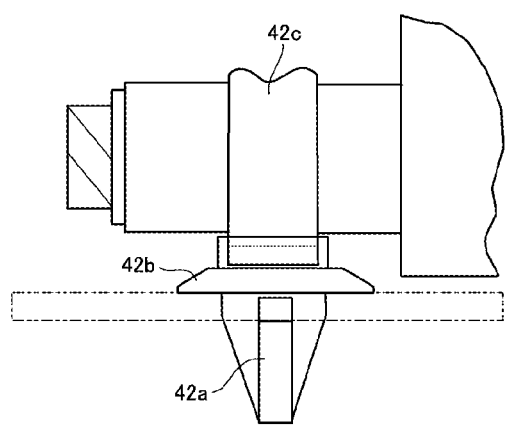
FIG. 7 is a partially enlarged view of the portion in the vicinity of a clamp portion of the electrical line group of the wire harness shown in FIG. 5.

FIGS. 5 to 7 show the electrical line group 1 of the wire harness W that has an electrical line shielding structure according to a second embodiment of the present embodiment. Note that in the following embodiments, the configuration itself of the electrical lines 11 and 12 of the electrical line group 1 are similar to the first embodiment, and the aspects of the ground connection member and the holding member are different from those of the first embodiment. Accordingly, configurations that are similar to or the same as those in the first embodiment will be described using the reference numerals of the corresponding constituent elements shown in FIGS. 1 to 4, and the points that are different from the first embodiment are described below.

As shown in FIG. 5, in the present embodiment, a ground connection member 41 in the form of a cable tie that can bundle the electrical lines 11 and 12 of the electrical line group is provided. In other words, instead of the drain wire 26 that is provided in the first embodiment, the ground connection member 41 of the present embodiment is configured as a holding member that holds the electrical lines 11 and 12 in a bundled manner.

Also, as shown in FIG. 6, the ground connection member 41 includes a holding member body 42 that is made of resin and in the form of a cable tie and holds the electrical lines 11 and 12 in a bundled manner, and a connection conductor film 43 that is formed so as to attach to the surface of the holding member body 42. Also, the connection conductor film 43 is configured by a vapor deposited film that is formed by RF ion plating.

More specifically, the holding member body 42 in the form of a cable tie is formed with polypropylene or nylon (registered trademark), or the like, and as shown in FIG. 7, includes a clip head portion 42b that has a locking claw 42a, and a cable tie portion 42c that can bundle the electrical lines 11 and 12 into a single bundled manner while being joined to the clip head portion 42b.

Also, the cable tie portion 42c has protruding and depressed portions (not shown in detail in the figures) in a serrated manner for locking on one surface side that is the outer circumferential surface at the time of tying, and as shown in FIG. 6, on the tip side there is an insertion-side band portion 42d on one end side that is thin and narrow, and a lock portion 42e for bundling on the other end side that receives and can retain the insertion-side band portion 42d.

While not shown in detail, a lock hole that allows for insertion of the insertion-side band portion 42d and a lock claw that protrudes into the lock hole are provided on the lock portion 42e for bundling. When the lock claw is engaged with the protruding and depressed portions in a serrated manner for locking of the insertion-side band portion 42d, the lock claw is in the form of a claw that retains the insertion-side band portion 42d, and can be any known a structure for the retaining of the cable tie.

In this case, the connection conductor film 43 is formed on at least the inner circumferential surface of the cable tie portion 42c, the surface range of the outer surface of the clip head portion 42b that can come into contact with the vehicle body panel, and the contact surface portion that performs conduction between the surface range and the inner circumferential surface of the cable tie portion 42c. For example, the connection conductor film 43 is formed on at least the inner circumferential surface of the cable tie portion 42c, and the entire outer surface of the clip head portion 42b.

The connection conductor film 43 of the ground connection member 41 in the form of a cable tie has a film thickness that is greater than or equal to the film thickness of the metal thin-film 23 for shielding of the electrical lines 12. The vapor deposition metal of the connection conductor film 43 may be the same as the vapor deposition metal of the metal thin-film 23 for shielding of the electrical lines 12, and may be formed by another vapor deposition metal that has a conduction rate that is higher than or equal to that of the vapor deposition metal of the metal thin-film 23.

In the vicinity of the cable tie position due to the ground connection member 41 in the form of a cable tie, the electrical line group 1 is surrounded and protected from the outside by the exterior member 28 for sheathing.

In the present embodiment as well, a wire harness W that has a shield structure that can exhibit the required shield effects, and sufficiently meet demands for cost mitigation and weight reduction, similarly to the first embodiment, can be provided.

Moreover, in the present embodiment, by holding the electrical lines with a ground connection member 41 in the form of a cable tie, assembly of the ground connection member 41 to the electrical line 1 is complete, and also, the metal thin-film 23 of the at least a portion of electrical lines 12 can be reliably and easily brought into contact with the ground connection member 41.

Furthermore, the connection conductor member 43 that has a ground function is formed by RF ion plating, and therefore adhesion to the holding member body 42 increases, and detachment is less likely to occur. Also, the connection conductor film 43 that is not prone to detachment can be formed on the surface of the holding member body 42 that is light-weight, comparatively flexible, and formed by resin or the like, and therefore a more stable state of contact can be ensured between the metal thin-film 23 for shielding of the electrical lines 12 on the outer circumferential side and the connection conductor film 43, weight reduction can be achieved, and also the metal thin-film 23 for shielding and the connection conductor film 43 are less likely to become damaged.

Third Embodiment

Figure 8A:
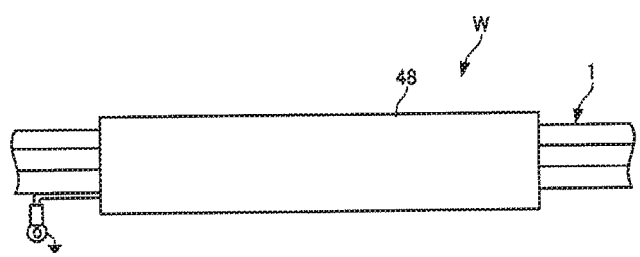
FIG. 8A is a side view of the principal portions of an electrical line group of a wire harness that has an electrical line shield structure according to a third embodiment of the present invention.
Figure 8B:
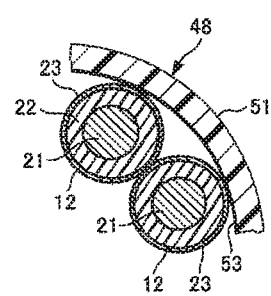
FIG. 8B is a partially enlarged transverse sectional view of a portion of electrical lines and a holding member that holds the electrical line group.

FIGS. 8A and 8B show the electrical line group 1 of the wire harness W that has an electrical line shielding structure according to a third embodiment of the present embodiment.

As shown in FIG. 8A, the electrical line group 1 is protected and surrounded from the outer circumferential by a holding member 48 having a predetermined length.

As shown in FIG. 8B, the holding member 48 includes a heat shrink tube body 51 (holding member body) that functions as a holding member that holds the electrical lines 11 and 12 in a bundled manner, and a connection conductor film 53 that has been formed so as to attach to at least the inner circumferential surface of the heat shrink tube body 51. Also, the connection conductor film 53 is constituted by a vapor deposition film that is formed by RF ion plating.

The drain line 26 comes into contact with the metal thin-film 23 of any of the electrical lines 12, the electrical lines 11 and 12 and the drain wire 26 are in contact with the connection conductor film 53 of the holding member 48, and in this state, they are bundled and held in a single bundled manner by the holding member 48.

Effects similar to the above embodiments can be obtained with the present embodiment as well.

Note that in the above-described embodiments, all of the electrical lines 12 that have a metal thin-film 23 for shielding as their outermost layer come into contact with each other, and are grounded by the drain wire 26 or the ground connection member 41 in the form of a cable tie. However, in the case in which there are many individual electrical lines in the electrical line group 1, an embodiment is conceivable in which at least one electrical line that has a metal thin-film for shielding as the outermost layer is held in the electrical group 1 in a state of being surrounded by electrical lines that have undergone insulating sheathing, and insulated from the electrical lines 12 that are in contact with each other so as to be grounded.

Also, in the above-described embodiments, the metal thin-film 23 and the connection conductor film 43 were formed by RF ion plating with high adhesiveness, but the films may be a vapor deposited film that is formed with a method such as sputtering. The holding member is not limited to a cable tie, and may be any well-known form that can bring together and hold the electrical line group 1 in a bundled state.

As described above, the present invention can provide a wire harness having a shield structure that can exhibit the required shield effects, and sufficiently meet demands for cost mitigation and weight reduction, and is generally useful to wire harnesses having a structure for shielding an electrical line group.

1 Electrical line group (multiple electrical lines)
11 Electrical line on central side (other electrical line)
11a Outer circumferential surface portion
12 Electrical line on outer circumferential side (a portion of electrical lines)
21 Conductor
21e Individual wire
22 Sheathing
22a Outer circumferential surface portion
23 Metal thin-film
26 Drain line (ground connection member)
27 Grounding lead line
27a Grounding terminal
28 Exterior member (holding member)
31 Connection terminal
31a Wire barrel portion
31b Insulation barrel portion
32 Insulating tube with heat shrink properties
41 Ground connection member
42 Holding member body
42a Lock claw
42b Clip head portion
42c Cable tie portion
42d Insertion-side band portion
42e Lock portion for bundling
43 Connection conductor film
48 Holding member
51 Heat shrink tube body (holding member body)
53 Connection conductor film

What is claimed is:

1. A wire harness comprising:
   an electrical line group that is held in a bundle, in which at least a portion of electrical lines that are positioned on an outer circumferential side of the electrical line group each have a metal thin-film for shielding as an outermost layer, the metal thin-film being formed so as to attach to an outer circumferential surface portion of a sheathing that surrounds a conductor of an electrical line;
   a ground connection member that is grounded and comes into contact with the metal thin-films of the at least a portion of the electrical lines;
   a holding member that holds the plurality of the electrical lines in the bundle; and
   the ground connection member positioned between and contacting an outer circumference of the electrical line group and the holding member.

2. The wire harness according to claim 1, wherein the metal thin-films of the at least a portion of the electrical lines are each a vapor deposition film formed by RF ion plating.

3. The wire harness according to claim 1,
   wherein the holding member includes a holding member body that holds the plurality of the electrical lines in the bundle and a connection conductor film that is formed so as to attach to the holding member body, and
   the connection conductor film includes a vapor deposition film that is formed by RF ion plating.

4. The wire harness according to claim 2,
   wherein the holding member includes a holding member body that holds the plurality of the electrical lines in the bundle and a connection conductor film that is formed so as to attach to the holding member body, and
   the connection conductor film includes a vapor deposition film that is formed by RF ion plating.

* * * * *